United States Patent Office 3,549,324
Patented Dec. 22, 1970

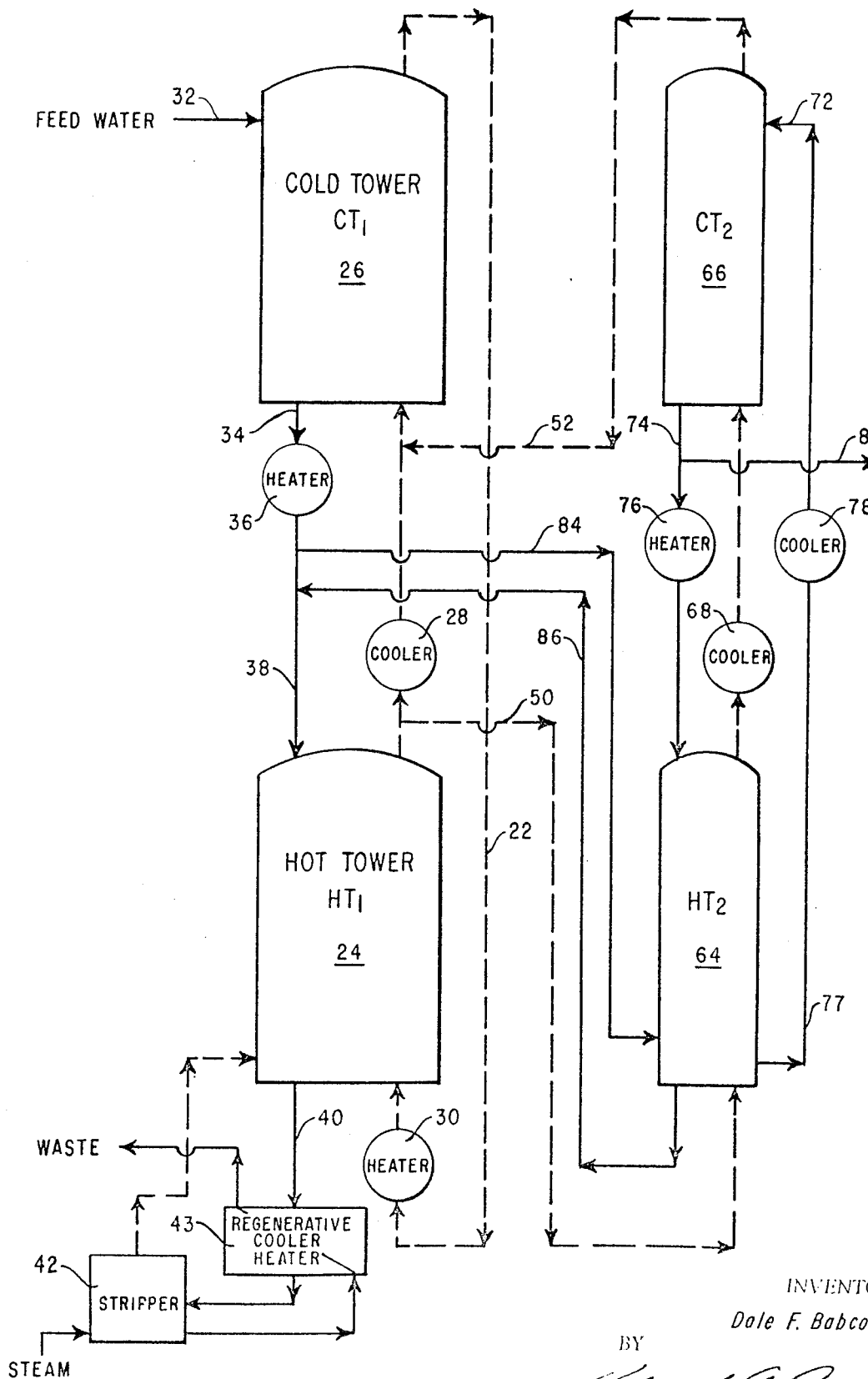

3,549,324
DUAL TEMPERATURE ISOTOPE
EXCHANGE PROCESS
Dale F. Babcock, Wilmington, Del., assignor to the United
States of America as represented by the United States
Atomic Energy Commission
Filed Apr. 16, 1968, Ser. No. 721,674
Int. Cl. C01b 5/02; B01j 1/00
U.S. Cl. 23—204      3 Claims

ABSTRACT OF THE DISCLOSURE

Liquid and gas containing a desired isotope flow countercurrently through two liquid-gas contacting towers in each stage of a multiple stage process. The towers are maintained at different temperatures to enrich the liquid in the isotope at one temperature and the gas in the isotope at the other temperature. Enriched liquid or gas is fed from a first to a subsequent stage into a tower operated to enrich the respective fluid. Enriched liquid from a first stage is also fed into the lower portion of a subsequent stage tower operated to enrich the gas in the isotope.

BACKGROUND OF THE INVENTION

The invention described herein was made in the course of, or under contract AT(07–2)–1 with the U.S. Atomic Energy Commission.

This invention relates to an improvement in the dual-temperature, isotope exchange process for concentrating an isotope of an element by its exchange between two substances at two temperatures. This process has been of major importance in the manufacture of heavy water.

In the breadth of application of the dual-temperature isotope exchange process to which the instant invention relates, a system is employed which comprises several stages of hot and cold liquid-gas contacting tower pairs wherein two substances are made to flow in countercurrent relationship. One of the two substances is fed to the first stage of the system, enriched in the isotope to be concentrated by preferential isotope exchange in the first of the pair of towers of that stage, depleted in the isotope in the second tower to below the feed concentration and discharged from the system as waste. The other substance is continuously circulated through the system as the separating agent in an essentially closed recycle flow. A portion of the flow of at least one of the substances is cascaded to subsequent stages as a means of coupling the stages. A portion of the flow of one of the substances is withdrawn as product from that portion of the system in which its concentration of the isotope is high. In the application of the process to the concentration of heavy water, the deuterium isotope is exchanged between water feed and continuously circulated hydrogen sulfide gas to attain concentration of the deuterium in the water.

Heavy water, deuterium oxide ($D_2O$), is useful as a moderator for nuclear reactors. It has been most commonly obtained from natural water where its concentration, or more correctly, the ratio of deuterium atoms to the total hydrogen atoms present, is only about one part in 7,000. This very dilute concentration and the similarities of the properties of $D_2O$ with $H_2O$ makes heavy water expensive to produce. This is true even though produced, as at present, in commercial scale quantities of hundreds of tons/year.

The production facilities which have produced nearly all of the free world's present supply of heavy water are described in considerable detail in A.E.C. R&D Report DP–400: Production of Heavy Water—Savannah River and Dana Plant—Technical Manual, W. P. Bebbington and V. R. Thayer, eds., J. F. Proctor, comp., Du Pont Co., Aiken, S.C. (1959) and by "Production of Heavy Water," by W. P. Bebbington and V. R. Thayer, Chemical Engineering Progress, vol. 55, No. 9, pp. 70–78 (September 1959).

The process practiced at the Savannah River production facilities (and at the Dana facilities until its shutdown in 1957) is a specific application of the dual-temperature, isotope exchange process. It has come to be known as the "GS" process and will be referred to as such hereinafter. The principles governing it are now well known and are fully explained in the above references and also in U.S. Pat. No. 2,787,526 entitled, "Method of Isotope Separation," issued Apr. 2, 1957 to J.S. Spevack, assignor to the U.S. Government. The brief summary of these principles in the paragraphs immediately following will facilitate an understanding of the invention.

While water is a compound of hydrogen and oxygen represented by the formula $H_2O$, any body of naturally occurring water contains a signficant quantity of hydrogen-oxygen compounds wherein one of the hydrogen atoms is the heavier isotope deuterium. This is expressed by the formula HDO. (At higher concentrations of deuterium, the isotope form $D_2O$ becomes significant.) In naturally occurring water about $\frac{1}{7000}$ of the hydrogen atoms present are the deuterium isotope. Similarly, hydrogen sulfide while mostly $H_2S$, also contains a measurable quantity of the isotopic form HDS.

When hydrogen sulfide gas and liquid water are intimately contacted, there is a rapid equilibration of the deuterium isotope between oxygen compounds and sulfur compounds thereby fixing the relative proportions of $H_2O$, HDO, $H_2S$ and HDS. Deuterium has a substantial preference for combination with oxygen rather than sulfur. However, this preference is stronger at a low temperature than at a higher temperature. This may be conveniently expressed by the equation

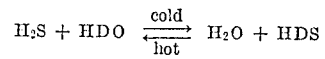

$$H_2S + HDO \underset{\text{hot}}{\overset{\text{cold}}{\rightleftharpoons}} H_2O + HDS$$

This difference in the equilibrium distribution of deuterium at different temperatures is the mechanism that the GS process exploits to effect concentration of $D_2O$.

In the GS process, water flows down through a cold tower and then through a hot tower in countercurrent relation to an upward flow of hydrogen sulfide gas. The water is progressively enriched in deuterium as it passes downward through the cold tower and progressively depleted in deuterium as it passes downward through the hot tower. Conversely, the hydrogen sulfide stream is enriched in deuterium as it passes upward through the hot tower and depleted in deuterium as it passes upward through the cold tower. Accordingly, the concentration of deuterium in each of the streams is maximum at the bottom of the cold tower and at the top of the hot tower, or figuratively speaking, between the towers. A portion of the enriched water between the hot and cold towers is withdrawn as product, or carried forward for further processing, the depleted water disposed of as waste, and the hydrogen sulfide stream continuously recycled as the separating agent. In the plural stage arrangement to which the instant invention is specifically related, stages subsequent to the first are coupled thereto by a cascade flow of a portion of one or both of the streams.

The capital investment in equipment necessary for practicing the GS process is very high. The capital investment at the Dana and Savannah River Plants amounted to about $120.00 per "annual pound" for the GS portion of the plants alone. Enormous quantities of fluids must be handled. Heretofore, extraction of about 20% of the deuterium in the feed water has been considered to be the economic rate. At that recovery rate, about 35,000 pounds of water must be fed for every one pound of $D_2O$ recovered. The gas flow rate per pound of $D_2O$ produced is even greater. Heretofore, about 140,000 pounds of gas has been cycled between the towers for every pound of $D_2O$ extracted. As will be readily appreciated by those familiar with the chemical engineering aspects of the GS process, it is this enormous gas flow that largely determines the size of the towers and other required equipment, the energy input per unit of product, and accordingly, the cost of the $D_2O$ produced. By far the largest portion of the energy consumed by the process is related to the heat reversals and attendant loss of nonrecoverable heat associated with this enormous $H_2S$ gas flow. The incentive in increasing the productivity of the process, and particularly with relation to the gas flow is, therefore, apparent.

The relationship of the liquid and gas flows, however, must be controlled within narrow limits in order for the process to be productive. As explained in A.E.C. R&D Report DP-3: S-Process Pilot Plant—First Run Results and Process Principles, D. F. Babcock, C. B. Buford, Jr., and J. W. Morris, Du Pont Co., Wilmington, Del. (1951), and further elucidated in J. W. Morris and W. C. Scotten, Chemical Engineering Progress Symposium Series, vol. 58, No. 39, (1962), variation from optimum liquid-gas ratios ($L/G$) by as little as 5% in either direction drastically decreases productivity of the plant.

I have found, however, that the productivity of the GS process can be significantly improved by purposely violating—and by more than 5%—the optimum $L/G$ ratios given in the above references in certain portions of the system. Since the improvement is obtained without any significant increase in the gas flow rate, the gain in productivity is obtained with only minor additional equipment and at economically advantageous per unit operating costs.

SUMMARY OF INVENTION

It is an object of this invention to increase the productivity of the dual temperature isotope exchange process. It is a further object of this invention to increase the productivity of that process by modification of the system that requires relatively little additional equipment and achieves the increase in productivity at economically attractive per unit operating costs. It will be understood that while as a matter of convenience the invention is described herein in relation to the specific application of the dual temperature isotope exchange process wherein the concentration of deuterium is effected by its exchange between $H_2S$ and $H_2O$—which at present is the only economically significant application of the process—the invention has general application to the dual temperature isotope exchange process. This general application of the invention will be readily appreciated by those familiar with this process.

While as mentioned above and more fully developed in the identified report, DP-3, and Morris and Scotten paper, operation of each tower within a narrow limit of a fixed optimum $L/G$ ratio has been considered essential to the operability of the GS process, I have found that while this is true in a general sense, departure from the fixed $L/G$ ratios at particular limited locations in particular manner, is not only permissible, but actually increases the productivity of the process. The particular location to which the invention of the instant application is directed is the lower portion of the hot tower of the second or other subsequent stage. My copending applications S.N. 721,675 and S.N. 721,676, each entitled, "Improvement in Dual Temperature Isotope Exchange Process," and each filed on Apr. 16, 1968 are directed to other particular locations.

According to the instant invention, increased productivity, realized as increased production or higher concentration product, or both, is obtained by increasing the flow of partially enriched water through the lower portion of the hot tower of a stage subsequent to the first by the introduction thereto of an additional flow of water from a preceding stage, the enrichment of the additional water being substantially the same as the normal feed to the top of the cold tower of the subsequent stage. In a broader sense, the increased productivity of the dual-temperature isotope exchange process is obtained by increasing the flow of partially enriched feed substance through that portion of the second or subsequent stage of the system wherein the concentration of the desired isotope is depleted below that in the normal feed to that stage by the introduction of an additional flow of the partially enriched feed substance to that portion.

The effect of this increased flow due to the additional stream of water having substantially the same deuterium concentration as the feed to the particular stage is to increase the deuterium concentration in the liquid on all plates subsequent to the added water feed point. The additional concentration in the liquid drives more deuterium into the vapor and therefore more deuterium is carried into the system above the added water feed point into the cold tower of the stage, thus increasing the productivity of the stage and therefore the system.

Optimum benefit from the improved water flow according to the invention would in general be attained by routing the entire water flow from the bottom of the first stage cold tower through the bottom portion of the second stage hot tower prior to its entry into the first stage hot tower. However, a benefit will be obtained even if only a portion of the flow of the enriched water from the first stage is routed therethrough.

While the foregoing briefly summarizes the invention and its objects and advantages, these and additional objects and advantages will appear and the summarized explanation of the invention understood from the following description of an embodiment thereof, the most novel features of which will be particularly pointed out hereinafter in connection with the appended claims.

BRIEF DESCRIPTION OF DRAWING

The single figure of drawing is a schematic diagram showing the flows of $H_2O$ and $H_2S$ in a GS process arrangement in accordance with the invention.

DESCRIPTION OF PREFERRED EMBODIMENTS

Referring to the drawing, the flow of the liquid water and hydrogen sulfide gas in accordance with the invention is illustrated in diagrammatic manner. For ease in understanding the flow of these substances, the components of the heat recovery loops have been omitted and the required changes in enthalpy in the various streams are indicated simply as heaters and coolers in the respective flow lines. Conventional items such as gas blowers, liquid pumps, valves, etc., have been omitted from the drawings since their use will be readily understood by those familiar with chemical engineering processes. The liquid water flows are represented by solid lines and the $H_2S$ gas flows by conventional dotted lines throughout.

With the exception of the improvement according to the invention, which will be specifically pointed out hereinafter, the drawing is a conventional flow sheet for the GS process. An essentially closed cycle 22 of $H_2S$ gas circulates upwardly through hot tower 24, cold tower 26 ($CT_1$) and then returned to hot tower 24 ($HT_1$). The structure of liquid-gas contacting towers 24 and 26 may be of any suitable design well known in the chemical engineering art. The $H_2S$ gas is cooled before entry into cold tower 26 and heated and humidified prior to its return to hot tower 24. These changes in enthalpy are figuratively represented by cooler 28 and heater-humidifier 30.

The usual feed water stream, after suitable preconditioning as may be required by equipment not shown, enters the top of cold tower 26 through conduit 32. The usual temperature for the cold tower is about 30° C. As this water flows down the cold tower it is sequentially contacted by the countercurrent flow of $H_2S$ gas, such contacting being enhanced by any suitable means, such as packing material, contacting trays, etc., in the towers. The water is continually enriched in deuterium as it proceeds through cold tower 26 due to the higher preference of the deuterium isotope to combine with oxygen then with sulfur. Conversely, the $H_2S$ gas is continually depleted in deuterium as it proceeds up the cold tower in countercurrent relation to the water. The enriched water exits cold tower 26 through conduit 34, and is heated by suitable means shown figuratively as liquid-heater 36 to about hot tower temperature, most usually about 140° C. The water enters the top of hot tower 24 through conduit 38 and as it proceeds down the hot tower it is continually depleted in deuterium content due to the relatively lower preference of the deuterium for the oxide form at the higher temperature. Water depleted in deuterium is discharged from the bottom of the tower through conduit 40 and after necessary stripping of the $H_2S$ gas dissolved therein, such as in stripper 42, and heat removal by useful work such as by regenerative heating of other streams (illustrated figuratively by regenerative cooler-heater 43) the water depleted in deuterium is discharged to waste.

The first stage is coupled to a subsequent stage or stages by cascading a portion of the gas flowing between the first stage towers to the subsequent stages. A portion of the hot gas flow is carried forward to the bottom of the second stage hot tower 64 ($HT_2$) through conduit 50, reduced to cold tower temperature in cooler 68 prior to entering cold tower 66 ($CT_2$) and returned from the top of cold tower 66 to the first stage via conduit 52. The water enters the top of cold tower 66 through conduit 72 and leaves the bottom through conduit 74. After being raised in temperature as in heater 76 it flows down through hot tower 64, exits through conduit 77 and is returned to cold tower 66 after being cooled as in cooler 78. This manner of coupling the stages through the gas flow is fully described in copending U.S. application S.N. 630,486 to Victor R. Thayer, assignor to the U.S. Government, filed Apr. 11, 1967, and issued Nov. 19, 1968 as U.S. Pat. 3,411,884. As will be more fully appreciated hereinafter, however, other arrangements for coupling the stages, as for instance that described in the above-referenced DP-400 Report, may be utilized with the improved flow arrangement according to the invention, which will now be described in detail.

To the essentially conventional GS process flow, just described, is added the feed of an additional water stream to the lower portion of second stage hot tower 64. This additional water is obtained from flow 38 of enriched water between first stage towers 24 and 26. The conventional flow between the towers is interrupted, and at least a portion of the first stage enriched water is diverted via conduit 84 to the lower portion of second stage hot tower 64 and made to flow therethrough. Upon discharge from the bottom of hot tower 64, the added water is returned to the first stage via conduit 86 and resumes its normal course downward through hot tower 24 and eventually to waste.

For optimum results, added water stream 84 should be introduced into second stage hot tower 64 on that tray at which the deuterium concentration in the process liquor is the same as that in the added water (after steady state has been achieved for the particular feed rate of added water in combination with the selected product draw-off rate). It will be appreciated that with the draw-off of enriched water from the second stage as for instance through conduit 88, the concentration of deuterium in the process liquor falls below that in the liquor fed to the cold tower of the second stage at some lower level of hot tower 64. Referring to the Savannah River Plant arrangement as a specific example—as fully described in the above cited references and operated in accordance therewith—under normal operation, i.e., without added water flow in the second stage hot tower as shown herein, the second stage process water flowing down the hot tower is returned to approximately the deuterium concentration it contained when introduced at the top of the second stage cold tower at about the seventh actual tray from the bottom. The total trays in the second stage of the Savannah River arrangement number 140.

Increasing the flow of process water through that lower portion of the second stage hot tower increases the concentration of deuterium in the liquid on every tray below the added water feed point as a function of the added water rate. Therefore, the ascending $H_2S$ stream entering the bottom of hot tower 64 is equiliberated with water of higher deuterium concentration than is the case without the added water. This drives more deuterium into the gas stream thereby increasing the absolute quantity of deuterium put into the second stage by the stripping action of the ascending gas stream in that portion of the stage wherein the process water is depleted in deuterium to below the concentration at which it was fed to the stage. This increase in deuterium input to second stage resulting from added feed water stream 84 may be withdrawn from between towers 64 and 66 as higher concentration product and/or increased quantity of enriched product.

Although the optimum location for making the water addition descends down the tower as the rate of addition increases the optimum location can be determined by empirical means without any undue difficulty. The plant can be operated for a period of several days with the added water stream entering at one location, and the productivity measured. Repeating this procedure for several locations will shortly reveal the optimum location for a particular rate of feedwater addition.

It will be appreciated that at least some increased productivity can be obtained through added enriched water feed to the lower portion of the second stage hot tower even though introduced at a less than optimum location. However, little benefit could be obtained by added water feed introduced at a point higher than about the lower one-third of the second stage hot tower in any economically practicable application of the GS process.

The amount of increased production attainable through added enriched water to the lower portion of the second stage hot tower is a function of the increase in the flow rate of process liquor through that lower portion. This is not a straight line relationship, however. While the productivity continues to increase with increased flow of added water, the rate of increase continually decreases. However, since the only cost involved in passing first stage enriched water through the lower portion of the hot tower is the required pump and piping equipment, it will generally be of advantage to pass the entire flow of first stage enriched water therethrough. The optimization of process parameters in the design of a new plant in order to achieve maximum benefit from the improved flow sheet according to the invention will be readily understood by one skilled in the chemical engineering art. Existing plants can also be modified to incorporate the improved flow, and obtain the attendant increase in productivity. Referring again to the Savannah River Plant as a specific example, passing the entire flow of first stage enriched water through the bottom portion of the second stage hot tower achieves a net increase in productivity of about 1%. Since this increase is achieved through extremely minimal expenditures, it is of significant economic interest.

It will be appreciated that the improved flow according to the instant invention may be used in conjunction with the improvements described in my copending applications S.N. 721,675 and S.N. 721,676 previously referred to, although the gains from each improvement will not necessarily be fully additive.

While the fundamental novel features of the invention have been shown and described and pointed out as applied to a preferred embodiment, it will be understood that various omissions and substitutions and changes may be made by those skilled in the art within the principle and scope of the invention as expressed in the appended claims.

What is claimed is:

1. In the dual-temperature, isotope-exchange process for concentrating an isotope of an element by its exchange between two substances containing said element, one in liquid and one in gas phase, in a system comprising at least two stages of hot and cold liquid-gas contacting tower pairs through which said substances are made to flow in countercurrent relationship, the liquid substance being:

fed to the first tower of the first stage of said system at a first concentration of the isotope to be concentrated, and to subsequent stages at partially enriched concentrations from preceding stages, enriched in concentration of said isotope by preferential isotope exchange in said first towers of each of said stages, depleted in concentration of said isotope by said exchange in the second of said pair of towers of each stage, the gaseous substance being continuously circulated through said pairs of towers in countercurrent relation to said liquid substance in essentially closed recycle flow, a portion of the flow of said liquid substance being withdrawn from that portion of the system in which said isotope is concentrated therein, and depleted liquid substance discharged from the first stage as waste, the improvement comprising increasing the flow of said liquid substance through said lower portion of the second tower of a stage subsequent to the first stage by passing therethrough substantially all of the partially enriched liquid substance from the first tower of the preceding stage, said partially enriched liquid substance being introduced into the second tower of the subsequent stage at about a location wherein the liquid substance in the tower does not exceed the isotope concentration of said partially enriched liquid substance.

2. In the dual-temperature, isotope-exchange process for concentrating the deuterium isotope by its exchange between water and hydrogen sulfide in a system comprising at least two stages of hot and cold liquid-gas contacting tower pairs through which liquid water and hydrogen sulfide gas are made to flow in countercurrent relationship, the water being:

fed to the cold tower of the first stage of said system at substantially natural concentration of deuterium, and to subsequent stages at partially enriched concentrations from preceding stages, enriched in deuterium concentration by preferential isotope exchange in the cold towers of said stages, depleted in deuterium concentration by said exchange in associated hot towers to below stage feed concentration in the lower portion of the respective hot tower, depleted water being discharged from the first stage hot tower as waste to the process, and enriched water being withdrawn from that portion of the system in which deuterium is concentrated therein, the hydrogen sulfide being continuously circulated through said tower pairs in countercurrent relation to the water in an essentially closed recycle flow, the improvement comprising increasing the flow of water through the lower one-third portion of the hot tower of a stage subsequent to the first stage by the introduction thereto of substantially all the partially enriched water from the cold tower of the preceding stage.

3. The improvement according to claim 2 wherein said water partially enriched in deuterium is introduced at about that level of said hot tower at which the concentration of deuterium in the process water therein is approximately the same as that in the added enriched water after the addition thereof with steady state operation.

References Cited

UNITED STATES PATENTS 2,787,526   4/1957   Spevack _____ 23—204

OSCAR R. VERTIZ, Primary Examiner

H. S. MILLER, Assistant Examiner

U.S. Cl. X.R.

23—283